US006980999B1

(12) United States Patent
Grana

(10) Patent No.: US 6,980,999 B1
(45) Date of Patent: Dec. 27, 2005

(54) METHOD AND SYSTEM FOR PROVIDING DIETARY INFORMATION

(76) Inventor: Clare Grana, 11923 Fawn Ridge La., Reston, VA (US) 20194

( * ) Notice: Subject to any disclaimer, the term of this patent is extended or adjusted under 35 U.S.C. 154(b) by 439 days.

(21) Appl. No.: 09/583,886

(22) Filed: May 31, 2000

(51) Int. Cl.[7] .............................................. G06F 7/00
(52) U.S. Cl. ................................... 707/104.1; 600/300
(58) Field of Search .......................... 707/10, 100, 102, 707/104.1, 500, 517, 1–7, 9; 705/1–3, 14, 705/15, 26, 27; 709/200, 204–207, 217–219, 709/245; 715/500, 517; 128/897, 920, 921; 283/900; 379/90.01, 93.01, 93.24, 100.08; 434/127; 600/300, 301; 99/324, 325

(56) References Cited

U.S. PATENT DOCUMENTS

| | | | | |
|---|---|---|---|---|
| 4,636,949 A | * | 1/1987 | Longabaugh | 700/90 |
| 4,703,423 A | | 10/1987 | Bado et al. | 705/1 |
| 4,807,169 A | | 2/1989 | Overbeck | 708/200 |
| 4,951,197 A | * | 8/1990 | Mellinger | 600/300 |
| 5,233,520 A | * | 8/1993 | Kretsch et al. | 600/300 |
| 5,332,579 A | * | 7/1994 | Umbdenstock | 424/639 |
| 5,542,420 A | * | 8/1996 | Goldman et al. | 600/300 |
| 5,544,040 A | | 8/1996 | Gerbaulet | 705/26 |
| 5,664,110 A | | 9/1997 | Green et al. | 705/26 |
| 5,673,691 A | | 10/1997 | Abrams et al. | 600/300 |
| 5,704,350 A | * | 1/1998 | Williams, III | 600/300 |
| 5,774,871 A | | 6/1998 | Ferro | 705/15 |
| 5,787,186 A | * | 7/1998 | Schroeder | 382/115 |
| 5,832,446 A | | 11/1998 | Neuhaus | 705/1 |
| 5,836,312 A | | 11/1998 | Moore | 128/897 |
| 5,848,399 A | | 12/1998 | Burke | 705/27 |
| 5,884,281 A | | 3/1999 | Smith et al. | 705/26 |
| 5,909,671 A | | 6/1999 | Byford et al. | 705/26 |
| 5,930,759 A | * | 7/1999 | Moore et al. | 705/2 |
| 5,954,640 A | * | 9/1999 | Szabo | 600/300 |
| 5,960,403 A | * | 9/1999 | Brown | 705/2 |
| 5,960,440 A | * | 9/1999 | Brenner et al. | 707/104.1 |
| 5,969,606 A | | 10/1999 | Reber et al. | 340/540 |
| 5,970,469 A | | 10/1999 | Scroggie et al. | 705/14 |
| 5,974,396 A | * | 10/1999 | Anderson et al. | 705/10 |
| 5,983,200 A | | 11/1999 | Slotznick | 705/26 |
| 5,991,739 A | | 11/1999 | Cupps | 705/26 |
| 6,038,546 A | * | 3/2000 | Ferro | 705/15 |
| 6,039,688 A | * | 3/2000 | Douglas et al. | 600/300 |
| 6,356,940 B1 | * | 3/2002 | Short | 709/217 |
| 6,375,077 B1 | * | 4/2002 | Hankins | 235/462.45 |
| 6,387,956 B1 | * | 5/2002 | Shapira et al. | 514/646 |
| 6,401,072 B1 | * | 6/2002 | Haudenschild et al. | 705/3 |
| 6,553,386 B1 | * | 4/2003 | Alabaster | 707/104.1 |

(Continued)

OTHER PUBLICATIONS

Grace J. Petot, et al., "An artificial intelligence system for computer assisted menu planning" Journal of the American Dietetic Association, vol. 98, No. 9, Sep. 1998, pp. 1009-1014.

Primary Examiner—Luke S Wassum
Assistant Examiner—Harold E. Dodds, Jr.
(74) Attorney, Agent, or Firm—W. Jackson Matney, Jr.

(57) ABSTRACT

An apparatus, method and data structure for procuring, analyzing, and communicating dietary information, particularly information regarding the research, evaluation and selection of dietary products. The system provides a comprehensive combination of dietary information in a format that facilitates analysis, decision-making, and procurement of various dietary products based on factors, including an individual's medical nutritional needs, current medication(s), cooking skills, budgeted food expense, food preferences, food allergies, life stage, and lifestyle.

48 Claims, 14 Drawing Sheets

U.S. PATENT DOCUMENTS

| | | | |
|---|---|---|---|
| 6,652,455 B1 * | 11/2003 | Kocher | 600/300 |
| 6,776,341 B1 * | 8/2004 | Sullivan et al. | 235/462.01 |
| 2001/0025279 A1 * | 9/2001 | Krulak et al. | |
| 2002/0002554 A1 * | 1/2002 | Herdman | |
| 2002/0026363 A1 * | 2/2002 | Dunaway | |
| 2002/0042745 A1 * | 4/2002 | Nacey | |

* cited by examiner

| | |
|---|---|
| 122 about e3squares | 102 interview |
| 124 display | 104 today's menu |
| 126 benefits offered | 106 this week's menu |
| 128 site layout/tour | 108 recipes |
| 130 membership benefits | 110 restaurants |
| 132 consult a dietician | 112 inventory |
| 133 consult a physician | 114 shopping |
| 134 newsletter | 116 education |
| 136 privacy statement | 118 community |
| 138 | 120 lifestyles |
| | 140 tracking |
| | 142 computations |
| | 150 help |

Figure 4

Interview Screen

- 201 personal data
- 202 anthropometrics
- 203 special metabolic needs
- 204 food preferences
- 205 health status
- 206 food allergies
- 207 life stage
- 208 dietary prescription
- 209 cooking complexity
- 210 meal plan override
- 211 professional referral

200

- 102 interview
- 104 today's menu
- 106 this week's menu
- 108 recipes
- 110 restaurants
- 112 inventory
- 114 shopping
- 116 education
- 118 community
- 120 lifestyles
- 140 tracking
- 142 computations
- 150 help

Figure 5

Shopping Screen

600

| 601 store(s) |
| 602 today's list |
| 603 entire list |
| 604 edit list |
| 605 kitchen items |
| 606 online grocer |
| 607 generate list |
| 608 online special |
| 609 competitive bids |
| 612 display |

| 102 interview |
| 104 today's menu |
| 106 this week's menu |
| 108 recipes |
| 110 restaurants |
| 112 inventory |
| 114 shopping |
| 116 education |
| 118 community |
| 120 lifestyles |
| 140 tracking |
| 142 computations |
| 150 help |

Figure 9

METHOD AND SYSTEM FOR PROVIDING DIETARY INFORMATION

BACKGROUND OF THE INVENTION

The invention relates in general to an apparatus, method and data structure for providing dietary information to assist in the research, evaluation, and selection of dietary products, including food, drink, and drugs, based on information provided by system users.

In the past, dietitians and nutritionists prepared personalized menus for individuals. Planning nutritious and appealing menus is a daunting and time-consuming task for a physician, nurse or even a master dietitian. Moreover, individual counseling sessions or traditional group sessions do not allow for menu planning time. Despite the obvious benefits, it is currently cost prohibitive for many individuals and households to obtain menu guidance. Therefore, most individuals or facilities in need of planned menus must plan them manually on their own or with the use of the primitive software or websites that produce template or static menus.

Several patents and articles have been published in the dietary field. For example, U.S. Pat. Nos. 4,807,169 (to Overbeck), 5,673,691 (to Abrams et al.), and 5,983,200 (to Slotznick); Balintfy, J. L., "Menu planning by computer," *Communications of the ACM*, 7:255–259 (1964); and Petot, G. J., et al., An Artificial Intelligence System for Computer-Assisted Menu Planning," *Journal of the American Dietetic Association*, 98:1009–1014 (1998), each of which is herein incorporated by reference in its entirety, relate to dietary information generally. Each of these references has serious deficiencies and none provide the comprehensive research, data acquisition, analytical tools, data evaluation, and user interface/selection of the present invention.

The foregoing demonstrates that there is a need for an invention which allows an individual to obtain dietary information based on a variety of factors, including an individual's medical nutritional needs, specific medication(s) (which may have drug/nutrient interaction implications), cooking skills, food expense budget, food preferences (including, for example, favorite recipes), food allergies, lief stage, and lifestyle.

SUMMARY OF THE INVENTION

The invention satisfies the need and avoids the drawbacks of the prior art by providing an apparatus, method and data structure that set forth an interactive venue for the procurement and analysis of a comprehensive aggregate of information relating to, but not limited to, diet, nutrition, medications, cooking skills, food budget, food preferences, allergies, life stage, and lifestyle. Access to the system of the invention greatly reduces the time and costs associated with the process of identifying specific foods, obtaining and compiling dietary information, analyzing the information, providing dietary advice, and procuring food for an individual, family or institution. As such, the invention provides an easy and reliable tool that combines a user-friendly interface with powerful databases and professional analysis to identify menu options that meet the needs of the user.

The invention relates to a knowledge-based system for personalized menu generation using various technologies for data manipulation to incorporate the information and expertise of professionals. In one aspect, the system may generate menus for individuals, households or groups and may search a database of recipes based on a set of inputs provided by the user and generated by the system. In a preferred aspect, a grocery list will be generated that may be printed and employed for traditional grocery shopping or may be utilized in conjunction with connections to on-line vendors.

According to one aspect of the invention, an apparatus for and a method of communicating dietary information between a user and a database are set forth. The apparatus and method may include the structure for and steps of storing dietary information on a database, searching the database for dietary information using specific criteria, and manipulating the information to provide a set of information. The set of information may be transmitted to the user or the user may be provided with a location on the database containing the information. System users may provide an assessment of the received dietary information by entering information into an evaluation form which may be accessed by future users. The apparatus and method may include assigning passwords to users to allow future use of the system.

In another aspect of the invention, a system for communicating dietary information contains a computer-readable memory for storing data for access by an application program and includes a data structure stored in the computer-readable memory. The data structure may include information used by the application program and may contain a plurality of personal data fields, anthropometrics fields, special metabolic needs fields, food preferences fields, health status fields, food allergies fields, life stage fields, dietary prescription fields, and cooking complexity fields. The application program may use the field values to provide a menu plan based on the manipulation of said plurality of fields by employing a combination of databases. In various aspects, a plurality of databases, such as a menu/recipe database, personal database, nutritional database and medication database, may be employed in varying combinations to compute a meal plan for a user.

BRIEF DESCRIPTION OF THE DRAWINGS

FIG. 4 illustrates an overview page constructed according to the principles of the invention.

FIG. 5 illustrates an interview screen constructed according to the principles of the invention.

FIG. 9 illustrates a shopping screen constructed according to the principles of the invention.

DETAILED DESCRIPTION

Figure 1:
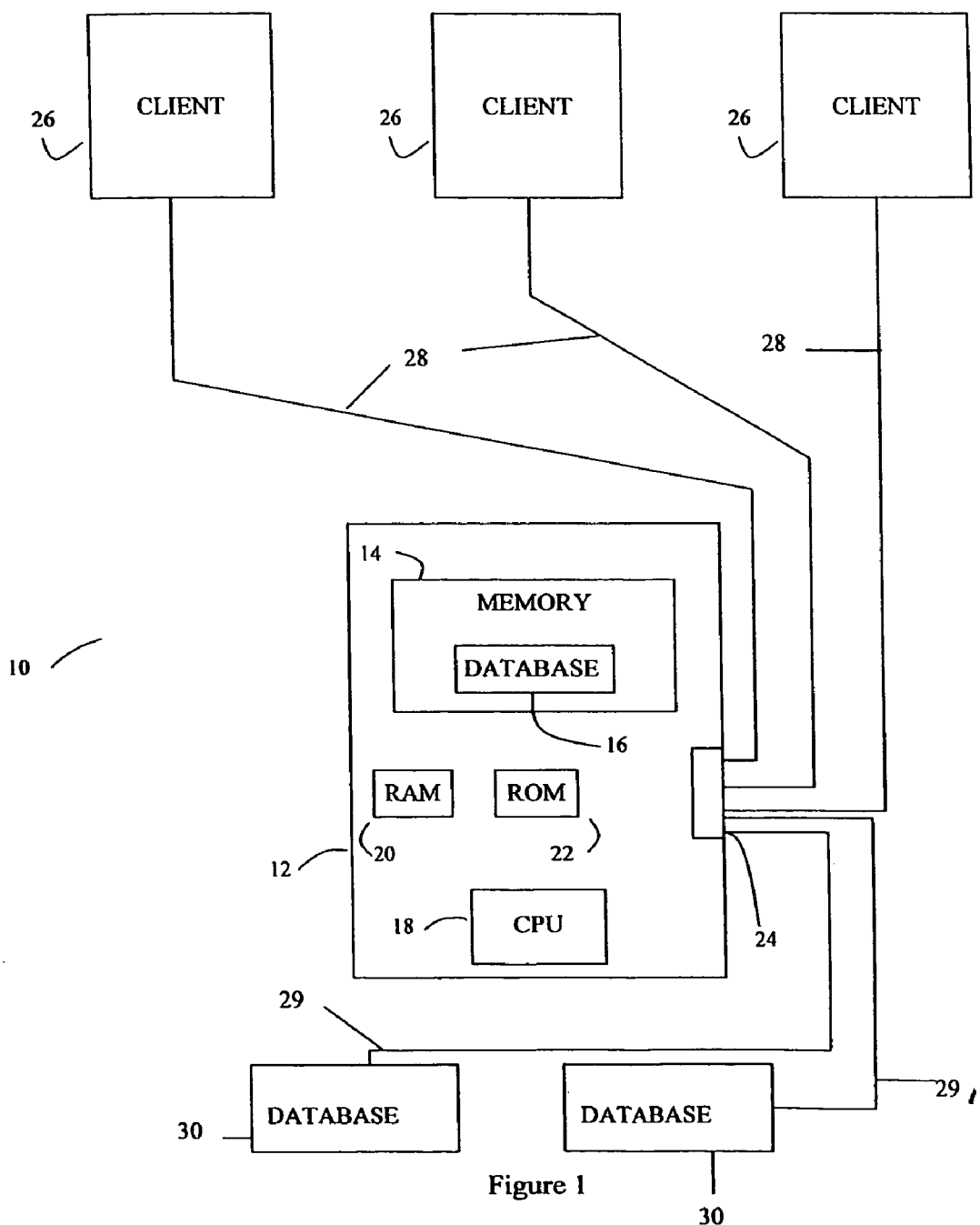
FIG. 1 illustrates a client-server-dietary database network for a preferred embodiment of the invention.

FIG. 1 shows a system 10 for communicating dietary information according to one aspect of the invention. The system 10 depicted in FIG. 1 includes a server 12 having a memory 14, and a database 16 defined in the memory 14. The server 14 may be an ALPHA server, a minicomputer, a microcomputer, a UNIX machine, a mainframe computer, a personal computer with an Intel Pentium processor, a Macintosh personal computer, or any other suitable computer. The memory 14 is preferably non-volatile and includes storage devices, such as CD-ROMs, hard disks, tape drives, etc. The server 12 has a central processing unit (CPU) 18, input devices such as a keyboard and mouse (not shown), output devices such as a monitor and printer (not shown), random access memory (RAM) 20, read-only (ROM) 22, serial and parallel ports (not shown), and communication hardware 24. There may also be additional memory (not shown) remote from the server 12 and connected to the server 12 via one of the aforementioned serial or parallel ports. The communication hardware 24 may connect the server 12 to the Internet. In a preferred embodiment, the server 12 is a World Wide Web server connected to the Internet. Preferably, the server 12 has an operating system that is capable of multiple users and multi-tasking, such as UNIX, Windows NT, or LINUX. FIG. 1 also demonstrates the inclusion of one or more client machines 26 and one or more external databases 30 which communicate with the server 12. FIG. 1 does not disclose the specific interconnections between and among the various components in the server 12 as this information is well known. Client machine 26 may be an ALPHA server, a minicomputer, a microcomputer, a UNIX machine, a mainframe computer, a personal computer with an Intel Pentium processor, a Macintosh personal computer, a laptop, a personal data assistant (PDA), a pen computer, a kiosk or any other suitable computer.

The client machines 26 may be connected to the server 12 by communication links 28, and the external databases 30 may be connected to the server 12 by communication links 29. The communication links 28, 29 between the server 12 and the client machines 26 and between the server 12 and the external databases 30, respectively, may include a large variety of connections, including a telephone link, a hard-wired connection, a satellite link or other wireless connection, an Internet connection, a local area network (LAN), a wide area network (WAN), any combination of the preceding, or any other suitable type of connection. Multiple client machines 26 may communicate simultaneously with the server 12, and each connection may be by a different type of link, e.g., one connection may be by telephone while another may be by the Internet. Similarly, multiple external databases 30 may communicate simultaneously with the server 12, and each connection may be a different type of link as discussed above. As stated above, the server 12 connects to communication links 28, 29 via communication hardware 24.

The server 12 may communicate, via communication link 29, with a particular database 30 by a variety of communication protocols, including file transfer protocol (FTP), electronic mail (e-mail), transfer control protocol/Internet protocol (TCP/IP), ASCII, X-MODEM, Y-MODEM, KERMIT, any combination of the preceding protocols, or any other suitable type of protocol. The server 12 may gather information from a database 30 automatically, e.g., at regularly scheduled intervals, only in response to data requested from a client machine 26, or both automatically and in response to a request from a client machine 26. Depending on the nature of the information provided by a particular database 30, the connection between the server 12 and the particular database 30 may be "live" at all times or may be established intermittently.

After a link is established between the server 12 and a client machine 26, communication may take place via a variety of communication protocols, as described above with respect to communication between the server 12 and database 30. The software running on a client machine 26 that accesses information on the server 12 may be a known Internet browser such as Netscape Navigator or Internet Explorer or may be any other type of software suitable for transmitting information to and receiving information from the server 12.

In one embodiment, the server 12 is an ALPHA server. With this platform, CPUs, memory, networking capabilities, storage, and software may be modified as appropriate to meet specific requirements. The selection of a suitable server requires consideration of CPU speed as well as disk subsystem performance and network bandwidth. For example, a disk with a 7200 RPM rotational speed may be a suitable disk subsystem. Once the RAID is selected (RAID 0, 1, 2, 3, 4, or 5), the size of the database and its projected growth must be analyzed as part of the known design considerations.

The database 16 on the server 12 may be of any suitable type that may be used for large database applications. Oracle is an extremely powerful and flexible relational database system. Procedural Language/Standard Query Language (PL/SQL) is a sophisticated programming language used to access the Oracle database from various environments. Another preferred database that may be employed is Oracle8*i*. The Oracle8*i* database for Internet applications and manages the content, data and files typically managed by an operating system. Oracle8*i* has a Java Virtual Machine, a native Java compiler, and Internet File System (iFS), which provides the ability to store, query, and manage a wide range of relational and non-relational data within the database. iFS, written in Java, allows users to store 164 data types, including spreadsheets, word processing documents, Web pages and e-mail, within the database and retrieve them either in native file format or in HyperText Markup Language (HTML) through a browser. iFS indexes each file automatically and gives users enhanced security, database search capabilities, backup and recovery. Other features on Oracle8*i* include WebDB, a environment run through a browser that enables developers to dynamically generate Web content and pages; SQLJ, a programming syntax that embeds SQL database statements into clients or server Java code; and interMedia, a system for managing rich data types used over the Web. Of course, other database systems may be utilized according to the invention.

In a preferred embodiment, a user uses a client machine 26 to connect to the server 12 via a communication link 28. The user may then log onto the database 16. Optionally, a password may be required of the user. If a password is required and the user has not used the system previously, the user is given a password by the server 12 or is prompted by the system 10 to obtain a password from an administrator of the server 12. Next, the user must enter the previously obtained password. Additional steps for repeating a password request if the user enters incorrect data or for permitting the user to create a unique password are known. A user who has used the previously has the option of editing or deleting information previously entered into the user's record.

After logging onto the server 12, a user may enter pertinent information into the database 16 concerning the type or types of information desired. As discussed below, a wide variety of data may be entered into database 16. The server 12 may be connected to one or more databases 16, 30. Once the information form one or more databases 16, 30 is entered into the database 16, a search may be performed using server 12 to identify information requested by a user. The server 12 may then format the requested information appropriately. Once the information is formatted, it may then be transmitted to a user at a client machine 26.

Figure 2:
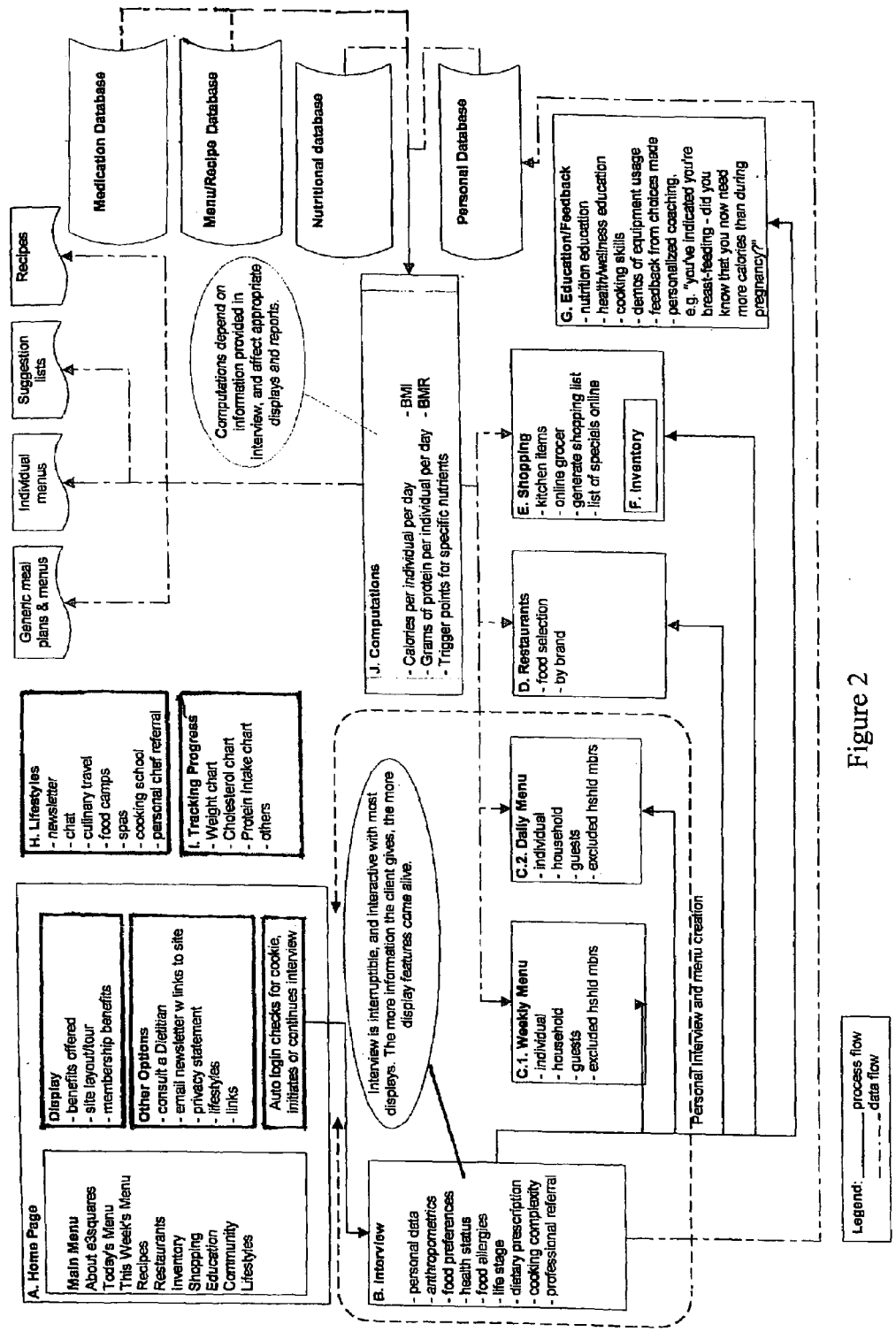
FIG. 2 illustrates a flow diagram for one embodiment of the invention.
Figure 3:
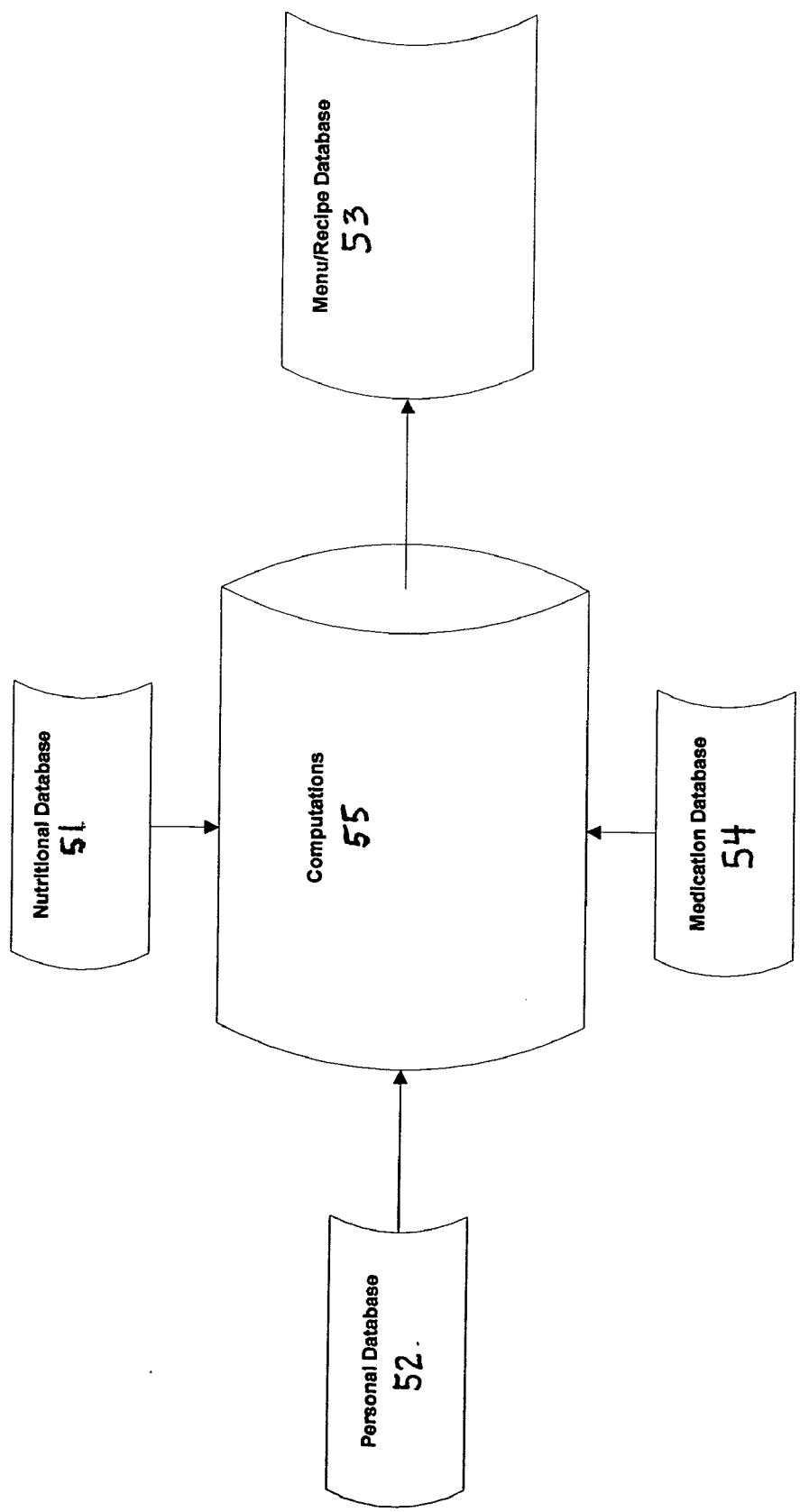
FIG. 3 illustrates one manner of integrating the information for the system.

A flow diagram showing one aspect of the invention is depicted in FIG. 2. Both data flow lines and process flow lines are shown which illustrate a manner in which a system user may navigate through system 10, according to one preferred embodiment. In FIG. 3, the relationships between various databases, Nutritional Database 51, Personal Database 52, Menu/Recipe Database 53, and Medication Database 54, are graphically depicted in relation to the computations module 55 of the invention and are further described below.

Navigation through the system 10 may be easily accomplished via a Web-style environment of point-and-click that directly links a user to desired sections. It is understood that selecting, pointing, clicking, choosing, and the like refer to the use of a mouse and mouse pointer, a stylus, a keyboard or any other device for selecting according to the principles of the invention. In a preferred embodiment, an overview page 100 is displayed on a client machine 26 after a user has logged onto the system 10. FIG. 4 illustrates overview page 100, which may include a plurality of options. For example, interview field 102, today's menu filed 104, this week's menu field 106, recipes field 108, restaurants field 110, inventory field 112, shopping field 114, education field 116, community field 118, lifestyles field 120, about e3squares field 122, tracking field 140, and computations field 142 are shown in FIG. 4. Display field 124, benefits offered field 126, site layout/tour field 128, and membership benefits field 130 are also depicted. A user may also select consult a dietician field 132, consult a physician field 133, a newsletter field 134, privacy statement field 136, and various other sources of dietary information and the like field 138. Selection of field 132 or 133 permits a user to communicate with a nutritionist or physician about a specific case or question. The invention may record such communications so that case-based reasoning technologies may be utilized to assist other users having similar future cases. More information about the system 10 may be obtained by selecting help field 150. These fields, when selected, connect a user directly to the section relating to the selected field. Of course, a greater or lesser number of fields may be included according to the principles of the invention.

In a preferred embodiment, fields 102, 104, 106, 108, 110, 112, 114, 116, 118, 120, 140, 142 and 150 are present in every view to permit efficient navigation throughout the system 10. The fields may be provided in a convenient drop-down menu or toolbar. Of course, window contents and toolbar options may be modified by the user.

Selection of interview field 102 permits a user to engage a listing of personal data, anthropometrics, special metabolic needs, food preferences, health status, food allergies, life stage, dietary prescription, cooking complexity, meal plan override, and professional referral questions as is illustrated in interview screen 200 in FIG. 5. Selection of personal data field 201 may result in general inquiries regarding name, address, e-mail address, phone, and gender, and specific questions regarding lifestyle such as, smoking, alcohol consumption, use of drugs (prescription and non-prescription), and stress level. A user's selection of anthropometrics field 202 requests the user to enter personal information relating to height, weight, age, gender, body composition, exercise level and life stage. For example, a menu for an elderly person may be created to account for specific nutritional needs and should consider whether a user is homebound. Selection of special metabolic needs field 203 may include questions regarding infections, recent trauma/surgery, HIV/AIDS, pregnancy/lactation, cancer therapy, pulmonary disease, liver disease, malnutrition, activity/exercise factors. Food preferences field 204 selection results in inquiries relating to specific foods, favorite cuisines, favorite flavors, and sweet, salty, savory, crunchy and smooth food options. Health status field 205 selection may provide questions regarding a plurality of conditions, including diabetes, heart disease, elevated blood pressure, elevated cholesterol, elevated triglycerides, kidney stones, irritable or spastic colon, gall stones, diarrhea, constipation or diverticulosis, kidney or liver failure, lactose intolerance, obesity or being overweight, and hiatal hernia or gastro-esophageal reflux disease. A user's selection of food allergies field 206 may request information about a user's reaction to a variety of foods, such as dairy products, wheat/gluten/corn, citrus, tomato and tomato products, soy foods, nuts, fish, shellfish, eggs, beef, lamb, poultry, and pork. Selection of life stage field 207 may provide a series of inquiries to define a user into one or more of the following categories: high school student, college student, starting a family, newly divorced or widowed, empty nest, retired, single, married. A user may also input major life stresses, if any, in life stage field 207. A user may also specify his or her physical or sports activity level in life stage field 207. Dietary prescription field 208 may include inquiries regarding calorie specific restrictions, diabetes, elimination of concentrated sweets or low sugar diets, low fat, low cholesterol, low fiber, high fiber, high calorie, high protein, low protein, no added salt (e.g., 3–5 gm sodium), low sodium (i.e., 2 gm sodium), low purine, low oxalate, low tyramine, and the like. System 10 may provide useful nutritional information from its Nutritional Database 51 regardless of the "nutritional education" level of a user. Additionally, field 208 may inquire regarding user goals, such as a desire to gain or lose weight. Selection of cooking complexity field 209 may allow a user to select from several cooking levels such as gourmet level of food preparation, basic cooking or master of the microwave, beginner, teenager, and the like. A user's selection of meal plan override field 210 may permit a dietary override feature to allow for prescribed, individualized meal patterns. Request professional referral field 211 may permit a user to search for and select a professional for assistance. The information provided by a user, as well as the other information generated by the system 10 relating to a particular user, may be stored in a unique Personal Database 52 and maintained in database 16 and protected by a user's password. The storage of the personal data creates a personal history in Personal Database 52 and permits a user to track progress, as is discussed below.

Figure 6:
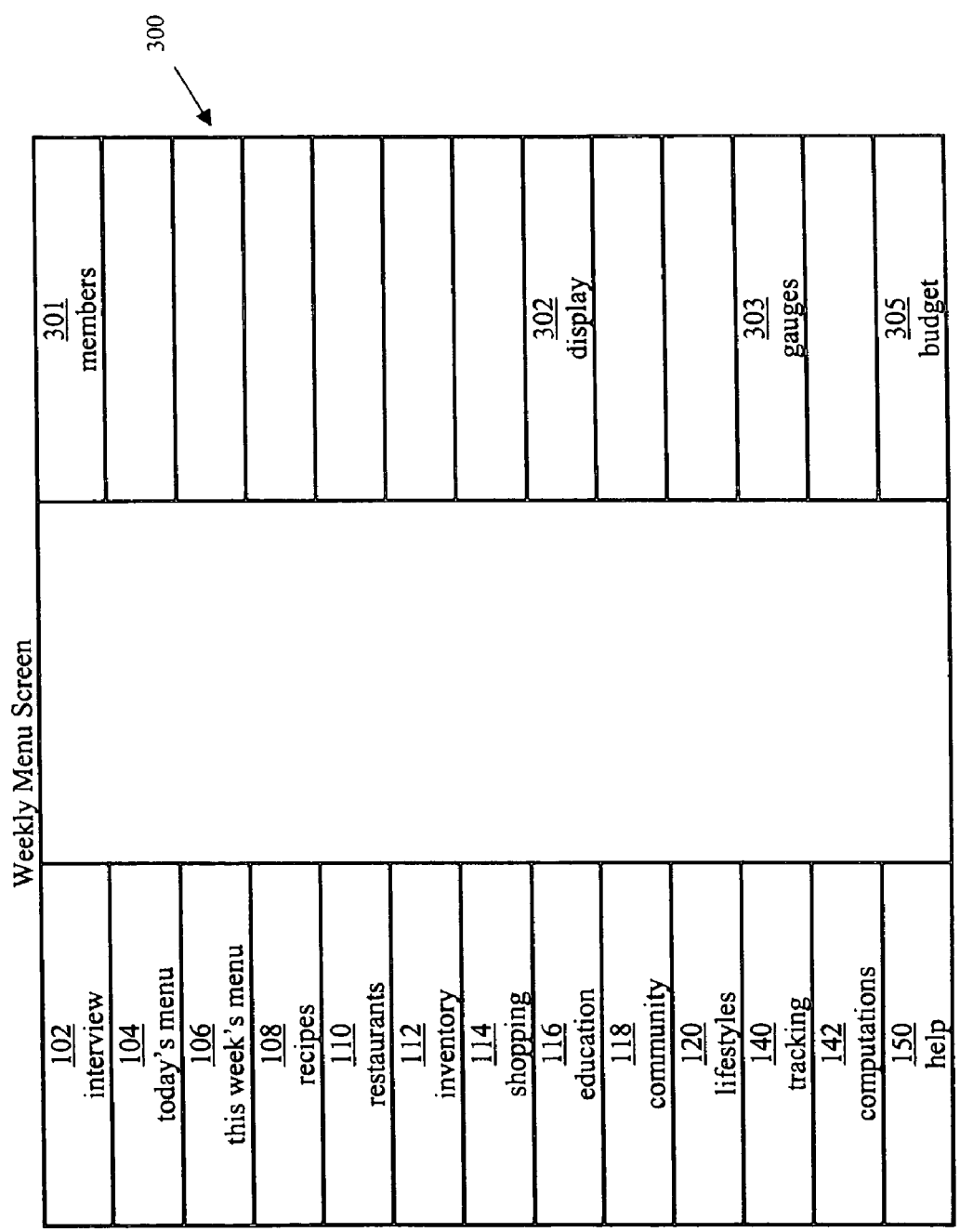
FIG. 6 illustrates a weekly menu screen constructed according to the principles of the invention.

Selection of this week's menu field 106 permits a user to be presented with a list of meals for a seven-day period according to the principles of the invention as illustrated in FIG. 6. Weekly menu screen 300 may include inquiries regarding the number of people considered for menu planning. In a preferred embodiment, weekly menu screen 300 will automatically list household members, for example, as derived from the interview module of the database in members field 301. A user then may include or exclude particular members based on their presence or need for menu planning for the week or any portion of the week thereof. In a preferred embodiment, a guest or guests may be added so that the need for additional menu planning is considered. In a further embodiment, a user has the option to be linked immediately or otherwise to the interview screen 200 in order to input guest information, such as special metabolic needs, health status, and food preferences and allegories, that should be considered in customizing the menu plan.

Weekly menu screen 300 may also include a display field 302 that displays all meals for the week based upon the user's responses to the interview questions, coded for personal food and health data as described above, and a Nutritional Database that may be created by professionals and maintained on the system 10. In a preferred embodiment, the Nutritional Database 51 is coded for nutrient content and appropriate and complementary meal components.

In a preferred embodiment, a gauges field 303 may be included that provides information and alerts according the generated menu. For example, gauges field 303 may include calorie, cholesterol, sugar or other nutritional information to indicate that a user or users are meeting or exceeding limits established by interview responses or an individualized menu plan based on the interaction between the Menu/Recipe Database 53, Nutritional Database 51, and the Personal Database 52. Additionally, through the use of a Medication Database 54, that may be created by professionals and maintained on the system 10, gauges field 303 may indicate potential or actual drug/food contraindications so that a user may be alerted to negative interactions prior to adoption of a particular menu plan. In another preferred embodiment, the information utilized from the Medication Database 54 may be incorporated with the Nutritional, Personal and Menu/Recipe Databases 51, 52, 53, respectively, so that the displayed menu plan takes all databases into account automatically.

Figure 7:
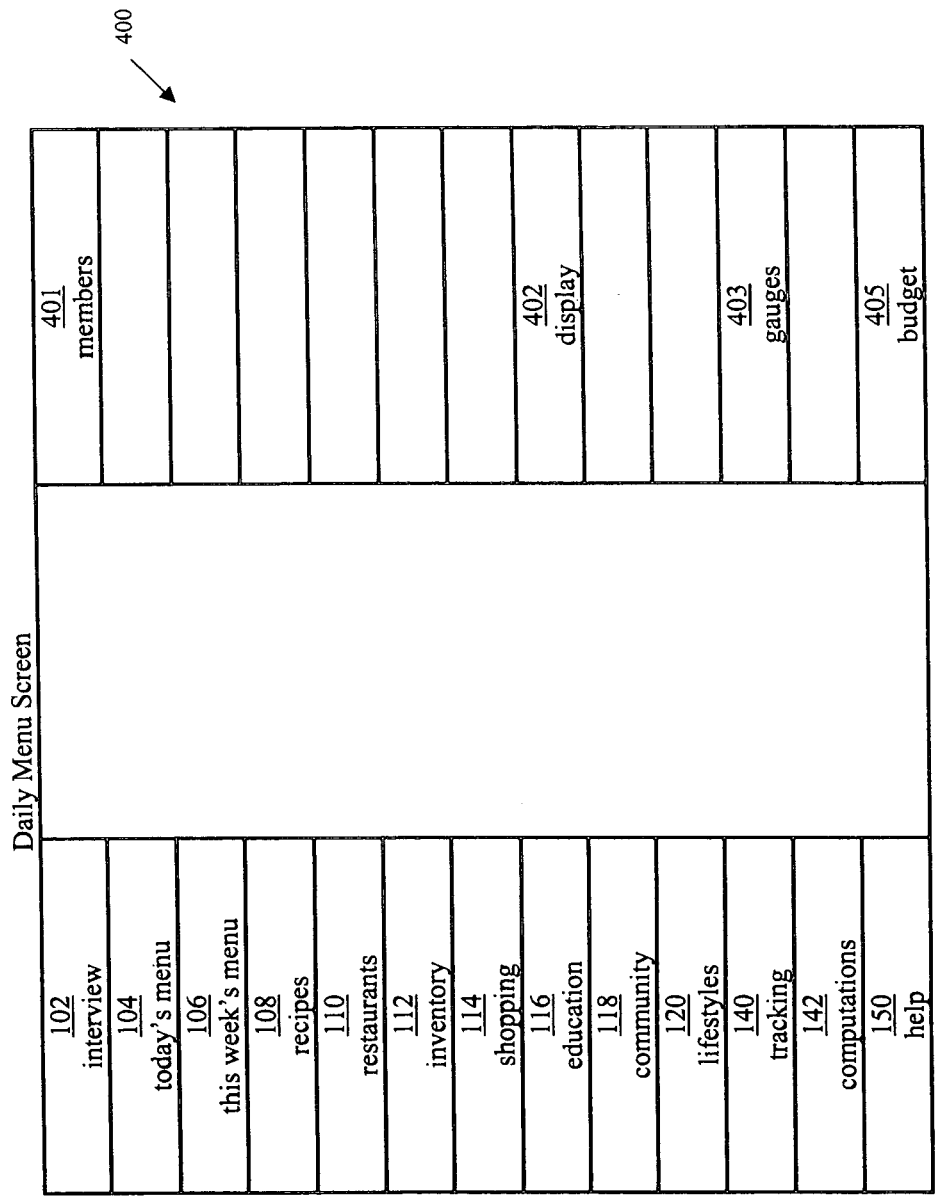
FIG. 7 illustrates a daily menu screen constructed according to the principles of the invention.

Selection of today's menu field 104 permits a user to be presented with a list of meals for a one-day period according to the principles of the invention as illustrated in FIG. 7. Daily menu screen 400 is similar to weekly menu screen 300 and may include inquiries regarding the number of people considered for menu planning. In a preferred embodiment, daily menu screen 400 will automatically list household members and permit a user to include or exclude particular members based on personal schedules in members field 401. In another preferred embodiment, a guest or guests may be added so that the need for additional menu planning is considered. In a further embodiment, a user has the option to be linked to the interview screen 200 in order to input guest information, such as special metabolic needs, health status, and food preferences and allergies, that should be considered in customizing the menu plan. Daily menu screen 400 may also include a display field 402 that displays all meals for the day based upon the members responses to the interview questions and the Nutritional Database 51. In a preferred embodiment, a gauges field 403 may be included that provides information and alerts according the generated menu as described above.

In a preferred embodiment, a user may select from a number of event-based meals. For examples, selection may be made from a variety of choices for events such as Thanksgiving, Christmas, Valentines Day, $4^{th}$ of July, St. Patrick's Day, daughter's birthday party, son's graduation party, business meetings, and the like. The databases may also maintain records of these event-based meals so that a user may recall and duplicate acceptable meals, avoid redundant meals with the same guests, and eliminate unsuccessful meals. Additionally, the databases may keep a record of a user's meals over time so that meal recommendations take into consideration recent meals to prevent redundancy.

In another preferred embodiment, a user may select budget fields 305 or 405 on screens 300 or 400 to enter a daily, weekly, monthly, or event-based budget. This allows a user to utilize system 10 and grocer pricing to work backwards to create a menu plan having needed items that are within a given budget. In this manner, nutritionally and medically approved foods are provided that meet a user's budgetary constraints as well.

Figure 8:
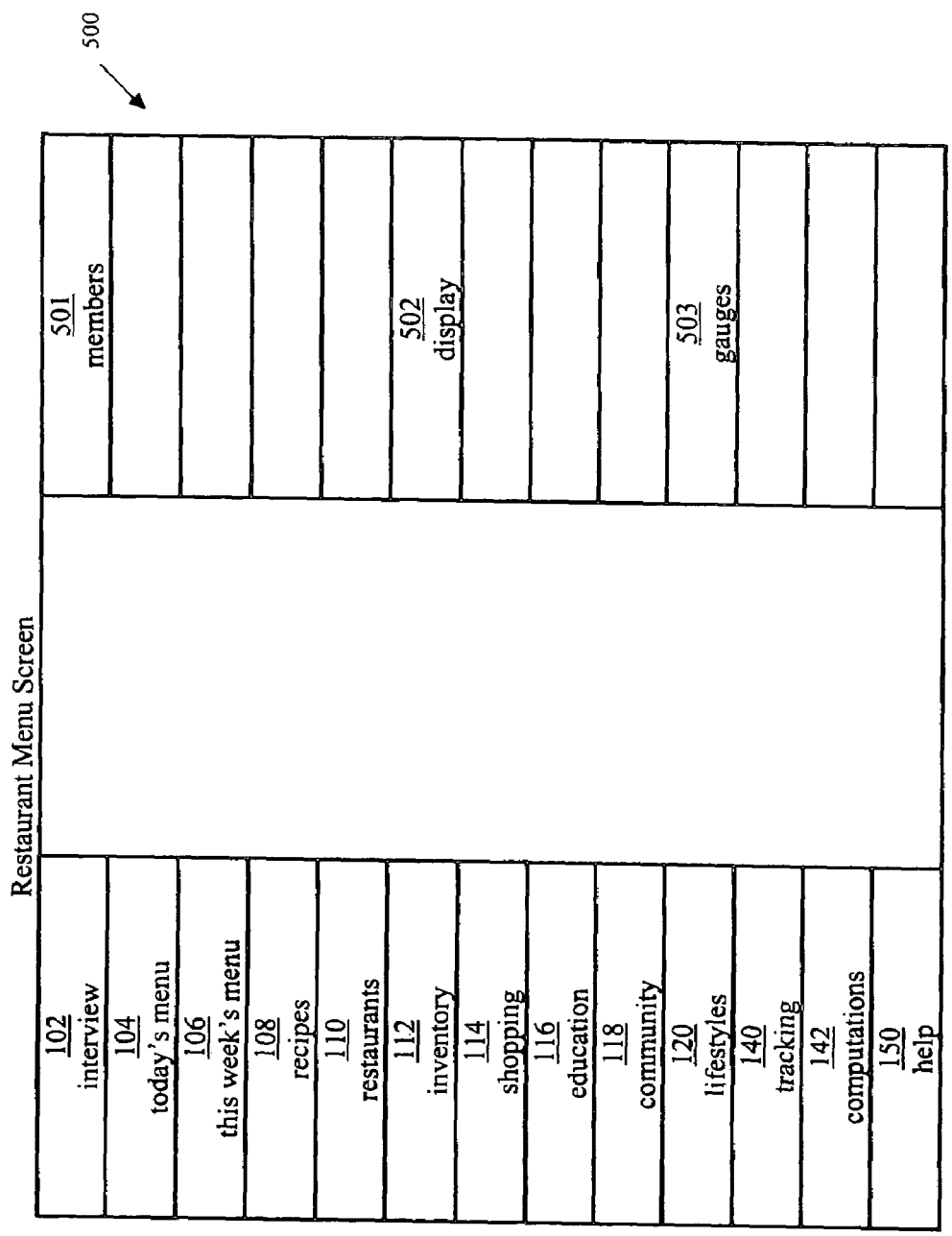
FIG. 8 illustrates a restaurant menu screen constructed according to the principles of the invention.

Selection of restaurants field 110 permits a user to be presented with a list of meals available at various restaurants according to the principles of the invention, as illustrated in FIG. 8. Restaurant menu screen 500 is similar to weekly menu screen 300 and may include inquiries regarding the household members and guests in members field 501. Options may be given to replace a meal or recipe previously associated with a particular user. A comprehensive listing of restaurants, including national and regional chains, may be included on restaurant menu screen 500 that permits a user, in conjunction with the nutritional, medication, and personal databases of the system 10, to receive a menu plan in display field 502. Display field 502 may include a two-panel display where one side shows the meal or recipe and the other side indicates a plurality of alternatives or replacements. Gauges field 503 may provide information regarding contraindications as discussed above. In a preferred embodiment, the restaurant suggestions displayed on display field 502 may be made in light of the information stored in the Nutritional, Personal, and Medication Databases 51, 52, 54, respectively, in the same manner as the system 10 considers these databases for non-restaurant-menu generation, which allows users and household members to maintain their planned diets in every venue. Of course, restaurant suggestions may be stored off-line for as many restaurants and household members are desired by the user.

Selection of shopping field 114 may permit a user to be presented with a list of fields in preparation to obtain the items identified by the daily or weekly menu display according to the principles of the invention as illustrated in FIG. 9. Shopping screen 600 includes select store(s) field 601, today's list field 602, entire list field 603, edit list field 604, kitchen items field 605, online grocery field 606, generate list field 607, online special field 608 and display field 612. Display field 612 displays information as directed by the selection of fields 601–608. For example, display field 612 may display a list of grocery stores when select store(s) field 601 is selected. Today's and entire list fields 602, 603 may provide the menu created and displayed in display fields 302, 402, as discussed above. A user may then sort the items by store, aisle, alphabetical order, or any other desirable sorting criteria. Fields 602, 603 may be modified by employing edit list field 604 and non-food items may be added to the list by utilizing the kitchen items field 605. Shopping screen 600 may include an online grocer field 606 or may contain links to a variety of online grocers to allow immediate order submission of the items generated by the system 10. The online special field 608 may be selected to identify the seasonal or weekly special promotions available online as marketed by both online and traditional grocers for purchase online or in-store. These "special promotion" items may be selected or may be added to the items in display field 612. The contents of display field 612 may be stored in the database 16 for later retrieval or historical manipulation.

Figure 10:
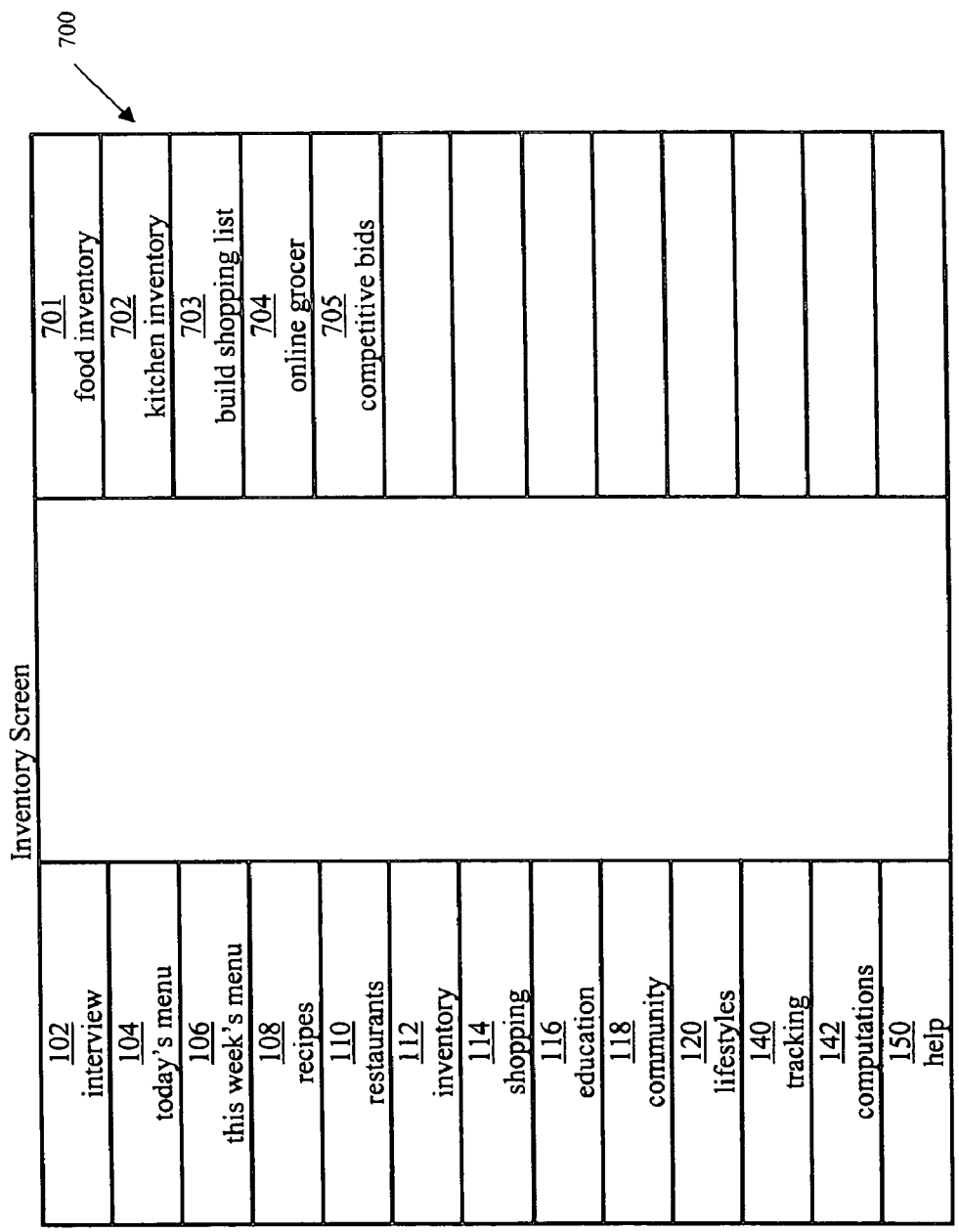
FIG. 10 illustrates an inventory screen constructed according to the principles of the invention.

Selection of inventory field 112 allows a user to facilitate the generation of a shopping list by employing inventory screen 700 according to the principles of the invention. As shown in FIG. 10, food inventory field 701, kitchen inventory field 702, and build shopping list field 703 may be provided to create a shopping list. In a preferred embodiment, the list of items generated by interaction with shopping screen 600 are compared with the information residing in the inventory database so that a list of needed items may be generated. Online grocer field 704 may be selected after the needed items have been identified. In one preferred embodiment, the inventory database not only stores items in categories, but it may also store reorder points for each item. Additionally, vendor preferences may be stored to support automatic shopping item placement on a pre-selected store list. For example, in another preferred embodiment, the system 10 may send a message to a user's call cell phone or PDA as a reminder of specific needed items that were generated for the week or for a specific day of the week by system 10 so that the user may be prompted to acquire the needed items.

In one preferred embodiment, a user may select competitive bids field 609 or 705 and by following the prompts the user may enter the needed items for transmittal to a preselected pool of grocers. Each selected grocer has the opportunity to respond, such as via system 10 or via email, by providing a price and/or other terms for each of the needed items. In this manner, grocers can compete for a user's order. If the grocers are equipped for online and delivery orders, then a user may select the grocer of choice and have the needed items delivered automatically.

Figure 11:
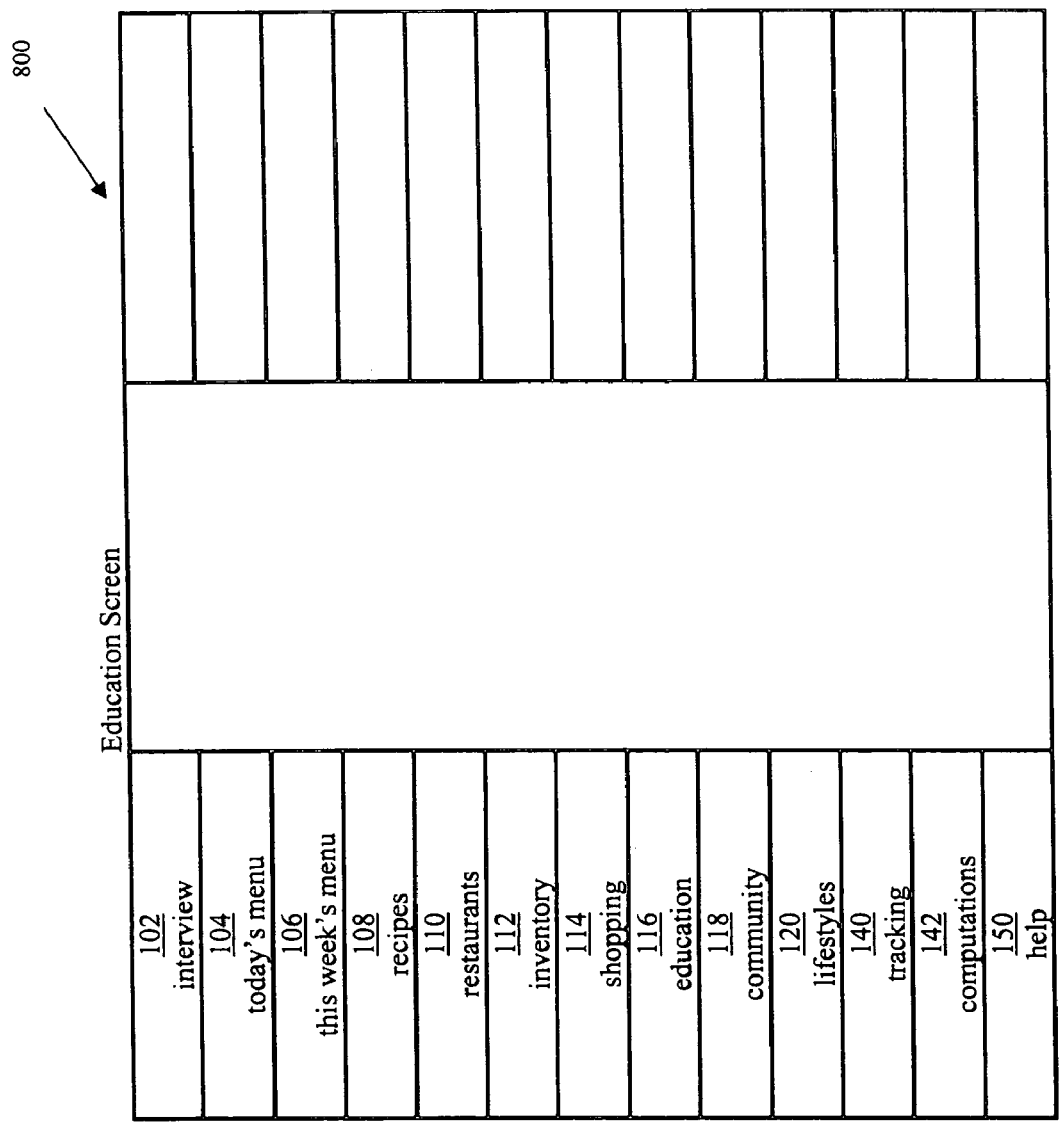
FIG. 11 illustrates an education screen constructed according to the principles of the invention.

Selection of education field 116 may permit a user to be presented with an education screen 800 including information regarding nutrition education, health/wellness education, cooking skills, online kitchen craft, demonstrations of equipment usage, using portions, eating as a family, feedback from choices made, and personalized coaching as shown in FIG. 11. By selecting any of these options, a user can obtain a variety of important information through databases 16, 30, links to relevant sources of information, and links to purchasing links, such as specialty foods, kitchen equipment, recipe books, and food publications. For example, personalized coaching provides specific feedback, such as, "You've indicated that you're breast-feeding—Did you know that you now need more calories that during pregnancy?"

Figure 12:
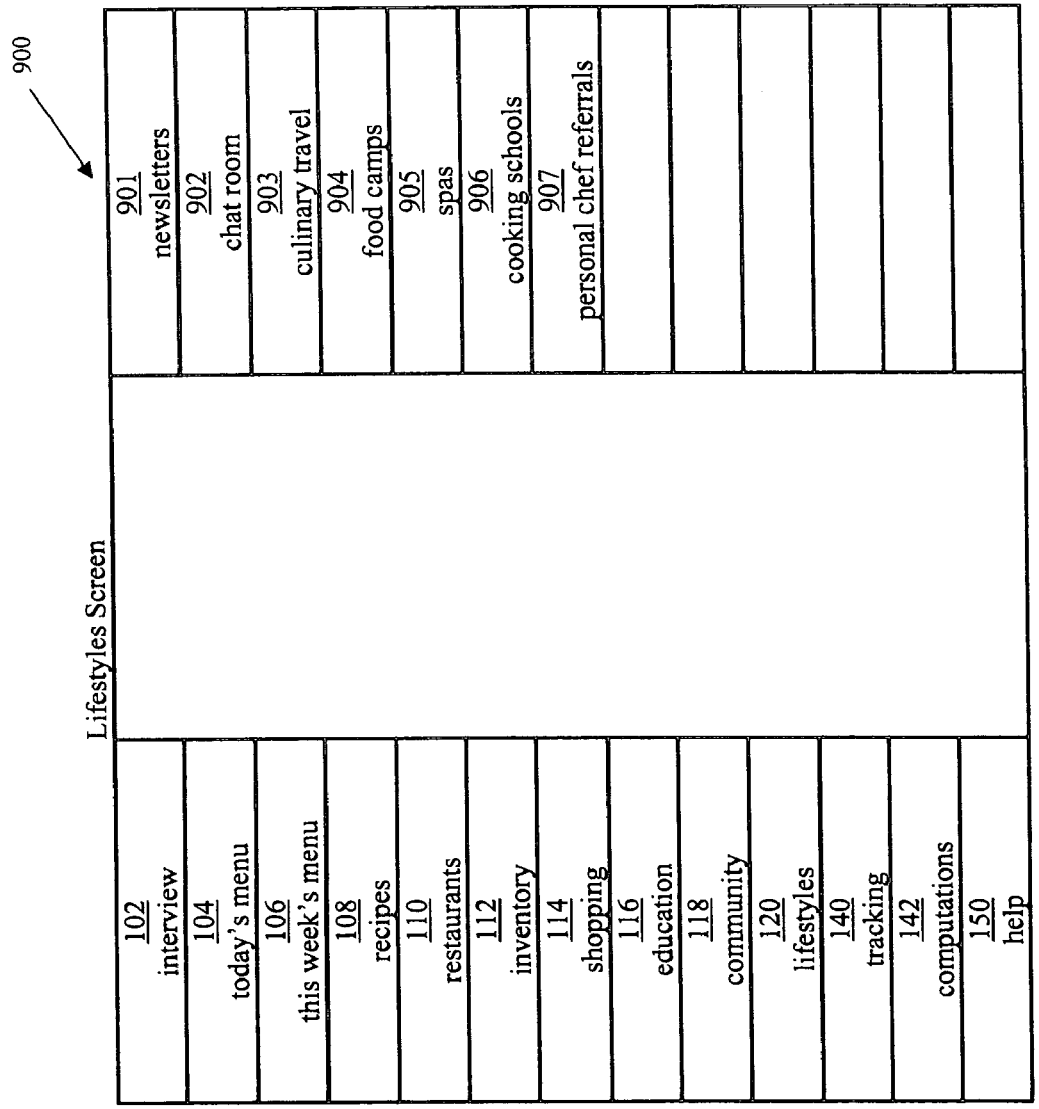
FIG. 12 illustrates a lifestyles screen constructed according to the principles of the invention.

Selection of lifestyles field 120 allows a user to view lifestyles screen 900 listing selectable options relating to newsletters field 901, chat room field 902, culinary travel field 903, food camps field 904, spas field 905, cooking schools field 906, and personal chef referrals field 907, as shown in FIG. 12. In one embodiment, lifestyles screen 900 facilitates the vacation planning of a user seeking to plan a diet- and/or health-related trip.

Selection of about e3squares field 122 provides a user with all pertinent information about system 10.

Figure 13:
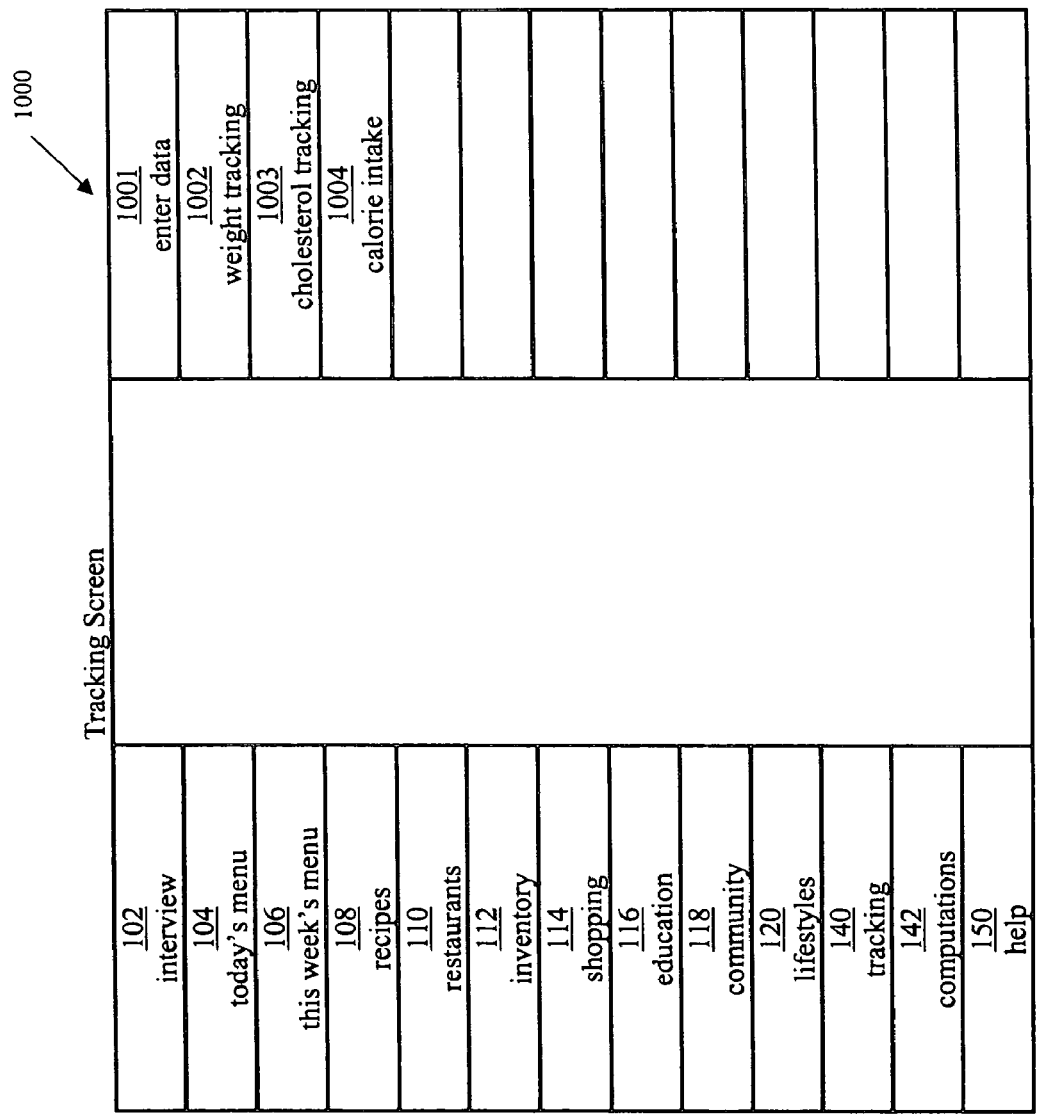
FIG. 13 illustrates a tracking screen constructed according to the principles of the invention.

Selection of tracking field 140 permits a user to track personal information relating to both measured data, such as weight, cholesterol, blood pressure, and menu-based data, such as protein intake, calorie intake, and the like. In fact, a user may enter and track data of any nature by selecting enter data field 1001 and following the prompts for setting up a tracking option as is illustrated by tracking screen 1000. For example, FIG. 13 depicts weight tracking field 1002, cholesterol tracking field 1003, and calorie intake field 1004. Tracking information may be displayed or stored on client machine 26. Comparisons between menu-based and measured data may be made to evaluate a user's status and progress.

Figure 14:
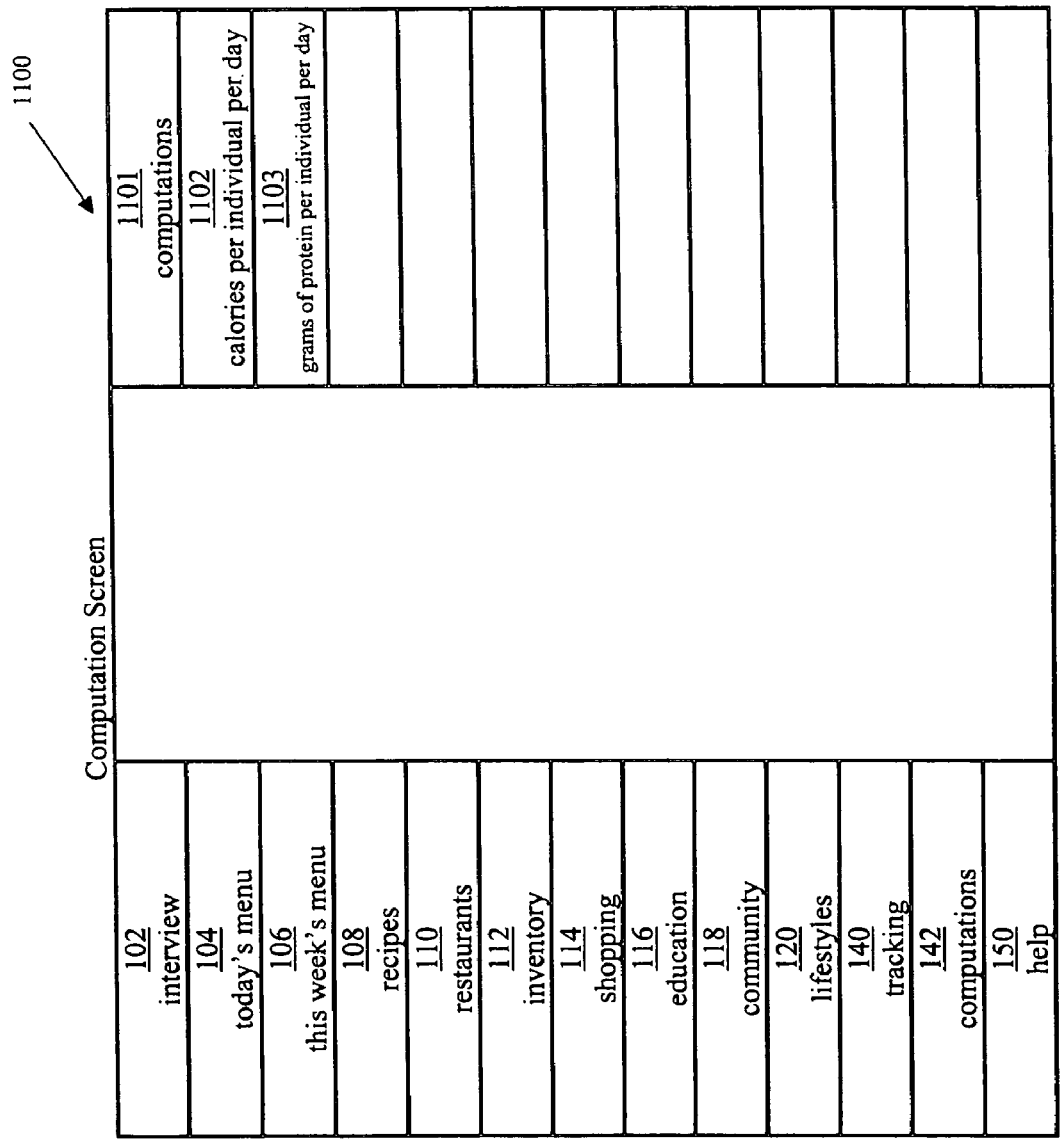
FIG. 14 illustrates a computation screen constructed according to the principles of the invention.

Selection of computations field 142 may allow a user to perform a number of calculations. As shown in FIG. 14 in connection with computation screen 1100, calories per individual per day field 1102, and grams of protein per individual per day field 1103 are identified. Additional computational fields may be created by selecting enter computational field 1101 and following the prompts for setting up a computational option.

Regarding the depicted templates, forms and reports of the invention, it is understood that a fewer or greater number of fields may be employed by adding or subtracting choices or by consolidating or expanding choices as desired. Additionally, it is further understood that certain of the fields may substitute menu selections or a lookup table for text entry fields or vice versa, according to the design criteria of the application. Save, reset, forward, and back buttons may be used in combination with one or more of the templates, forms, and reports. A feedback submission field may be preferably provided so that users may convey assessment information relating to menu planning and the system 10 itself to the controller of the system 10, so that the system 10 may be continually improved.

In a preferred embodiment, the information displayed on the screens of the invention may be printed or stored off-line in a client machine 26, such as a personal computer, laptop, PDA or pen computer for retrieval at a later time. In one preferred embodiment, client machines 26 will include special computer terminals having bar code readers for entering purchased goods into system 10 to permit a user to create a record of purchases. Additionally, client machines 26, such as kiosks, may be located in grocery stores to permit "near" point-of-sale access to the dietary information in the system 10 and may also provide generic menus free of charge to users that have not provided interview responses.

Menu/Recipe Database 53 is scalable and may store individual and household menus for local, regional and international recipes. Additionally, the Menu/Recipe Database 53 may store food qualities such as color, texture, flavor, nutritional attributes, appropriateness for specific diets, cultural preferences, life stages, and scalability. A user may add favorite recipes to the Menu/Recipe Database 53 for selection at a later time. Additionally, a user may add, subtract or modify the amounts or ingredients in any of the recipes to accommodate the personal needs of the user. The Menu/Recipe Database 53 may consider the seasonal and regional variations in ingredients and recipes so that the menus generate by system 10 closely conform to the user's needs. The response to the cooking complexity field 209 may instruct the Menu/Recipe Database 53 to factor the cooking expertise level into menu planning. Meal patterns received from the personal database, e.g., a user or member eats cereal for breakfast everyday, may be considered by the Menu/Recipe Database 53. The Menu/Recipe Database 53 may make recommendations regarding vitamins, herbs and diet supplements. The Menu/Recipe Database 53 may consider individual plans from the personal database, e.g., organic, vegetarians, vegan, kosher. A feedback loop may also be provided that gives helpful hints while meal planning.

System 10 employs a variety of technologies that are integrated according to the principles of the invention. These technologies may include expert systems, case-based reasoning, rule-based reasoning, search engines, financial transaction capabilities, databases, networking web or servers, and data-mining systems. These technologies are employed to incorporate the knowledge and expertise of a physician, nutritionist, food preparer, and user by electronically programming information to produce explicit knowledge to be handled by intelligent software. Thus, the knowledge system of the invention provides comprehensive dietary information and facilitates the procurement of food, drink, and supplements, and provides a shopping cart to carry needed items to vendors. The system 10 makes the knowledge and expertise of a nutritionist available to a user by assessing a user's personal medical file and interview summary to provide a recommendation for the ultimate menu for health and lifestyle. For example, case-based problem solving may be used by system 10 to apply a prior solution to generate the solution to a new problem. System 10 has the capability to store user's cases and solutions to facilitate the resolution of similar future cases.

EXAMPLE

A host, designated A, is planning a meal for a plurality of guests, designated B-G, with the following criteria: B and C do not eat meat or poultry; C is allergic to milk, products; D, E, and F are "meat-and-potatoes" people; and A's friend, G. Since t is tomato season, A wants to use tomatoes as a major ingredient in the meal. As A is planning the meal, h remembers:

I once served tomato tart (made from mozzarella cheese, tomatoes, dijon mustard, basil, and pepper, all in a pie crust) as the main dish during the summer when I had vegetarians as guests for dinner. [Event-based system memory.] It was delicious and easy to make. But I can't serve that to C (the one allergic to milk). [Guest interview summary memory.] I have adapted recipes for C before by substituting tofu products for cheese. [Menu/Recipe substitutional memory.] I could do that, but I don't know how good the tomato tart will taste with tofu.

A decides not to serve tomato tart and continues planning. Since it is summer, he decides that grilled fish would be a good main course. [Menu/Recipe seasonal memory.] But then remembers:

"Last time I tried to serve G grilled fish, she wouldn't eat it. I had to put hot dogs on the grill at the last minute." [Time constraint memory.] This suggests to A that he should not serve fish, but he wants to anyway. He considers whether there is a way to serve fish that G will eat.

A remember seeing G eat mahi-mahi in a restaurant. He recalls that the fish he previously served G was whole trout with the head on. The fish in the restaurant was a fillet and more like steak than fish. [Guest interview summary memory and Menu/Recipe substitutional memory.] A determines that he should serve a fish that is more like meat than fish and concludes that swordfish is acceptable. [The success/failure of the meal may be recorded and cross-referenced to each of the participants A–G.]

This example, or case, illustrates a typical real-life problem that knowledge, decision, and remembered cases can suggest a means of solving a new problem (e.g., suggestion of a main dish), to suggest how to adapt an appropriate solution. As the bracketed items emphasize, the solution requires reliance on a variety of data. System 10 simultaneously provides this information to thousands of users where each user enters different limiting criteria.

The previous case illustrates a manner in which a system, according to the principles of the invention, may be utilized.

First, there are at least two uses for this case: (1) it provides a condition for success when choosing a vegetarian main dish with tomatoes: choose tomato tart to feed vegetarians in the summer, and (2) it provides a condition for success when trying to accommodate a person who is allergic to milk when a main dish with cheese is being served. Thus, when trying to adapt a dish with cheese in it for someone who eats no milk products, use tofu as a cheese substitute.

Second, the case provides input to determine under what circumstances this case would be useful for constructing a solution: (1) when the goal is to choose a main dish, the dish is to be vegetarian, the dish is to include tomatoes, and the time is summer; and (2) when main dish has cheese as an ingredient, one or a few guests are allergic to milk products, and the goal is to accommodate those guests.

Third, descriptions of the case are translated into the vocabulary of the user, making them recognizable to the user. System 10 considers how data are structured and sets weighted values for each type of decision. System 10 also addresses the choice of structuring various data records. In the above case, there is a simple set of fields for representation of possible types of data: guest, host, cuisine, ingredients, preparation method, dishes (subdivided into salad, main dish, sides, beverage, dessert, and dessert-beverage), reasoning goal, constraints, season, results, and the like. Some of these fields have further substructure. For example, each dish may have several optional descriptors: cuisine, taste, texture, ingredients, preparation method, constraints. In a preferred embodiment, the system of the invention retains all possible cases and retrieves information and makes recommendations according to a unique user's inputs and constraints.

According to the invention, menus may be grouped and classified to user-defined groups and classes. Menus may be set up for multiple serving lines and months. Standard menus may be established and stored, individually or in cycles and assigned to later periods of times as needed by a particular user. Both menu calendars and menu lists may be created and printed. In one embodiment, the system databases are preloaded with all USDA items, brands, and "team nutrition" recipes. In another embodiment, system 10 is connected to government databases that provide a variety of useful information employed by the invention, such as nutritional information, standards for breakfast and lunch for children, and the like.

System 10 may also compute nutrient composition for menus associated with an age group or range of grade levels for comparison to the USDA information and weighted nutritional analysis for a one- to seven-day menu cycle. System 10 may print cost analysis for a range of menu days, production recipes automatically scaled, pre-preparation summaries, recipe ingredient labels, and menus printed in a variety of formats.

What is claimed is:

1. A method of communicating manipulated dietary information to a user comprising:
    storing dietary information on a dietary information database, wherein said dietary information database comprises a menu/recipe database, a nutritional database, a personal database, and a medication database;
    inputting and storing user criteria in said personal database,
    identifying specific dietary information meeting user criteria, wherein said identifying step comprises said personal database interacting with the menu/recipe database and optionally with the nutritional database, or the medication database;

retrieving said specific dietary information;

manipulating said specific dietary information wherein said manipulated dietary information comprises a menu of planned meals;

transmitting said manipulate dietary information from accessible to a user machine, thereby communicating said manipulated dietary information to said user;

inputting a user assessment into the user machine, wherein the user assessment is of at least one of the manipulated dietary information or the interaction of the personal database with the at least one of the menu/recipe database, the nutritional database, or the medication database; and transmitting and storing said user assessment to the dietary information database over the internet for access by other future users over the internet.

2. The method of claim 1 wherein the manipulated dietary information includes drug/food contraindications, and wherein said identifying step comprises said personal database interacting with both the menu/recipe database and the medication database.

3. The method of claim 1 wherein said user criteria comprises anthropometric data.

4. The method of claim 1 wherein said user criteria comprises metabolic data.

5. The method of claim 1 wherein said user criteria comprises food preferences.

6. The method of claim 1 wherein said user criteria comprises health status data.

7. The method of claim 1 wherein said user criteria comprises food allergies data.

8. The method of claim 1 wherein said user criteria comprises life stage data.

9. The method of claim 1 wherein said user criteria comprises dietary prescription data.

10. The method of claim 1 wherein said user criteria comprises cooking complexity data.

11. The method of claim 1 wherein said manipulated dietary information further comprises a shopping list for items needed to prepare the meals in the menu.

12. The method of claim 11 wherein said manipulated dietary information further comprises a list of grocery stores at which the items are for sale.

13. The method of claim 1 wherein said menu comprises a list of all meals planned on at least one day.

14. The method of claim 1 wherein said manipulated dietary information further comprises at least one gauge, wherein said gauge is selected from amount of calories, amount of cholesterol, and amount of sugar determined to be present in said meals.

15. The method of claim 1 wherein said user criteria comprises data about other individuals.

16. The method of claim 1 wherein said user criteria comprises a request for help regarding inputting, storing, or accessing information in the dietary information database or a request for access to a nutritionist or a physician.

17. The method of claim 1 wherein said personal database comprises at least one of personal data, anthropometric data, food preferences data, health status data, food allergies data, life stage data, dietary prescription data, metabolic needs data, goals data, budget data, or cooking level of said user.

18. The method of claim 17 wherein said personal data comprises name and gender information of said user.

19. The method of claim 17 wherein said anthropometric data comprises at least one of height and weight information or age information of said user.

20. The method of claim 17 wherein said food preference data comprises at least one piece of information that reports a favorite cuisine of said user, a favorite flavor of said user, or a user's response to an inquiry with regard to a specific food.

21. The method of claim 17 wherein said health status data comprises at least one piece of information that reports that said user has or does not have a condition, wherein said condition is selected from the group consisting of diabetes, heart disease, elevated blood pressure, elevated cholesterol, elevated triglycerides, kidney stones, irritable or spastic colon, gall stones, diarrhea, constipation, and diverticulosis.

22. The method of claim 17 wherein said life stage data comprises at least one piece of information that reports a life stage category for said user, a major life stress of said user, or a physical activity level of said user, wherein the life stage category of said user is selected from the group consisting of high school student, college student, starting a family, newly divorced, newly widowed, empty nets, retired, single, married, and homebound.

23. The method of claim 17 wherein said dietary prescription data comprises at least one piece of information reporting a calorie restriction, a sugar restriction, a dietary fat restriction, a dietary cholesterol restriction, a dietary fiber requirement, a dietary protein requirement, a salt restriction, a purine restriction, an oxalate restriction, or a tyramine restriction for said user.

24. The method of claim 17 wherein said metabolic needs data comprises at least one piece of information reporting an infection, a recent trauma, a recent surgery, HIV/AIDS status, pregnancy status, lactation status, a cancer therapy treatment, pulmonary disease status, liver disease status, nutrition status, or activity level of said user.

25. The method of claim 17 wherein said cooking level of said user is selected from the group consisting of gourmet level, basic cooking level, microwave cooking level, beginner cooking level, and teenager cooking level.

26. The method of claim 17 wherein said goats data comprises information that said user has a goal of losing weight or information that said user has a goal of gaining weight.

27. The method of claim 1 wherein said medication database is created by professionals.

28. The method of claim 1 wherein the menu/recipe database comprises a list of meals available at a particular restaurant.

29. The method of claim 1 wherein the dietary information database comprises information or links to information regarding nutrition education, health education, cooking skills, online kitchen craft, demonstrations of equipment usage, using portions, eating as a family, purchasing specialty foods, kitchen equipment, recipe books, food publications, newsletters, chat rooms, culinary travel, food camps, spas, cooking schools, or personal chefs.

30. The method of claim 1 wherein said manipulated dietary information comprises a vacation plan.

31. An apparatus communicating manipulated dietary information and from a computer to a user comprising:

an internet;

a user machine operably connected to said internet for inputting, storing and retrieving said dietary information;

a plurality of databases comprised of a menu/recipe database, a personal database, a nutritional database, and a medication database, wherein said personal database is adapted to interact with the menu/recipe database and optionally with the nutritional database, or the medication database; and a computer operably connected to both said internet and said plurality of databases said , wherein said computer is adapted to search said plurality of databases to identify information relating to a plurality of factors as specified by said user, said computer comprises a storage area, said computer is adapted to store said identified information in said storage area, said computer is adapted to manipulate said transmitted stored identified information to provide a summary of appropriate dietary information including a menu of planned meals said computer is adapted to store said summary in said storage area, and said computer is adapted to transmit at least one of said summary or a location of said stored summary to said user machine via said internet;

wherein said plurality of factors include at least one of anthropometric, metabolic, life stage, or dietary prescription data.

32. The apparatus of claim 31 wherein said plurality of factors comprises food preferences data.

33. The apparatus of claim 31 wherein said plurality of factors comprises health status data.

34. The apparatus of claim 31 wherein said plurality of factors comprises food allergies data.

35. The apparatus of claim 31 wherein said plurality of factors comprises cooking complexity data.

36. The apparatus of claim 31 wherein said personal database comprises at least one of personal data, anthropometric data, food preferences data, health status data, food allergies data, life stage data, dietary prescription data, metabolic needs data, goals data, budget data, or cooking level of said user.

37. The apparatus of claim 36 wherein said personal data comprises name and gender information of said user.

38. The apparatus of claim 36 wherein said anthropometric data comprises at least one of height and weight information or age information of said user.

39. The apparatus of claim 36 wherein said food preference data comprises at least one piece of information that reports a favorite cuisine of said user, a favorite flavor of said user; or a user's response to an inquiry with regard to a specific food.

40. The apparatus of claim 36 wherein said health status data comprises at least one piece of information that reports that said user has or does not have a condition, wherein said condition is selected from the group consisting of diabetes, heart disease, elevated blood pressure, elevated cholesterol, triglycerides, kidney stones, irritable or spastic colon, gall stones, diarrhea, constipation, and diverticulosis.

41. The apparatus of claim 36 wherein said life stage data comprises at least one piece of information that reports a life stage category for said user, a major life stress of said user, or a physical activity level of said user, wherein the life stage category of said user is selected from the group consisting of high school student, college student, starting a family, newly divorced, newly widowed, empty nest, retired, single, married, and homebound.

42. The apparatus of claim 36 wherein said dietary prescription data comprises at least one piece of information a calorie restriction, a sugar restriction, a dietary fat restriction, a dietary cholesterol restriction, a dietary fiber requirement, a dietary protein requirement, a salt restriction, a purine restriction, an oxalate restriction, or a lyramine restriction for said user.

43. The apparatus of claim 36 wherein said metabolic needs data comprises at least one piece of information reporting an infection, a recent trauma, a recent surgery, HIV/AIDS status, pregnancy status, lactation status, a cancer therapy treatment, pulmonary disease status, liver disease status, nutrition status, or activity level of said user.

44. The apparatus of claim 36 wherein said cooking level of said user is selected from the group consisting of gourmet level, basic cooking level, microwave cooking level, beginner cooking level, and teenager cooking level.

45. The apparatus of claim 36 wherein said goals data comprises information that said user has a goal of losing weight or information that said user has a goal of gaining weight.

46. The apparatus of claim 31 wherein said medication database is created by professionals.

47. The apparatus of claim 31 wherein the menu/recipe database comprises a list of meals available at a particular restaurant.

48. The apparatus of claim 31 wherein the plurality of database comprises information or links to information regarding nutrition education, health education, cooking skills, online kitchen craft, demonstrations of equipment usage, using portions, eating as a family, purchasing specialty foods, kitchen equipment, recipe books, food publications, newsletters, chat rooms, culinary travel, food camps, spas, cooking schools, or personal chefs.

* * * * *